UNITED STATES PATENT OFFICE.

PAUL WILHELM FERDINAND GEORG BETZ, OF BERLIN, GERMANY.

PROCESS OF PRODUCING A HORN-LIKE SUBSTANCE FROM CASEIN.

No. 893,129.

Specification of Letters Patent.

Patented July 14, 1908.

Application filed October 25, 1905. Serial No. 284,399.

*To all whom it may concern:*

Be it known that I, PAUL WILHELM FERDINAND GEORG BETZ, engineer, a subject of the King of Prussia, German Empire, and residing at Bambergerstrasse 18, Berlin W. 30, German Empire, Prussia, have invented a new and useful Process of Producing a Horn-Like Substance from Casein, and do hereby declare that the following is a full, clear, and exact description of the invention, which will enable others skilled in the art to which it appertains to make and use the same.

This invention relates to a process for the production or to the manufacture of a compact mass, as hornlike substance from casein or other albuminous substances, which may be used for various purposes, for instance, as a substitute for celluloid, ivory, jet, amber, glass, hard rubber and the like, for making films and plates for photographic purposes, or even for treating or covering paper, textiles, leather, wood, metals or for other purposes.

It is known, that formaldehyde has the property of rendering casein insoluble in water and of hardening the same. In consideration of this fact some methods have already been proposed. One method proposed consists in mixing a basic solution of original casein with formaldehyde and in drying the mixture by evaporation; another method consists in preparing a paste formed out of original casein in alkaline solutions with filling materials &c. and in treating this paste in wet or dry state with formaldehyde. The products manufactured after these methods are insoluble in water, but have the property, when immersed in water, of swelling up and becoming quite soft and unable to resist mechanical influences. Moreover, a process has been known according to which original casein is precipitated out of a basic solution by means of salts or acids and these casein-precipitations in insoluble form are in an almost dried state impregnated with formaldehyde. The producing of solid compact masses from casein by coagulating it out of its acidulated basic-solutions or out of its acid-solutions by means of formaldehyde, has however not yet come in use, but it is just this, that the present invention depends upon.

Exact trials have shown that it is not possible to obtain a true coagulation of the original casein out of alkaline solutions by means of formaldehyde, that is an alkaline solution of original casein is not to be transformed into a perfect coagulum by agency of formaldehyde. If for instance a clear casein solution is to be prepared by dissolving about 30 grams of original casein in an alkali lye for instance of about 3 to 4 grams caustic soda and 300 grams of water, so that after several days of rest a perfectly clear solution is to be obtained and if afterwards there is added to this clear solution either a small or a large quantity of formaldehyde, in each case it will be noticed that a coagulation is not obtained. Also if an opaque alkali-casein-solution is to be used, for instance, by dissolving about 80 grams of original casein in a lye of about 1 to 2 grams caustic soda and 1000 grams of water, or also if a solution of original casein is to be prepared in carbonate of soda and to these solutions formaldehyde is added, a coagulation is not to be obtained. If furthermore, a basic casein solution of original casein in ammonia is to be produced, a small addition of formaldehyde will sometimes only produce a thickening of the solution, which after a short time transforms itself into a liquid solution and a large addition of formaldehyde will only sometimes result in a slight cloudiness or opacity. Even by this method a formaldehyde-casein-coagulation is not to be obtained as the inventor produces it in his process and makes use of it for his manufacture.

The inventor of the present process has discovered that a true complete and also available coagulation of dissolved casein by the agency of formaldehyde can be obtained in a perfect and reliable manner by means of a special treatment of the casein before the gaseous or dissolved formaldehyde has been added to it.

Tests have proved that, when original casein or a casein solution is treated with an acid and after that with ammonia or, vice versa, with ammonia first and then with an acid, the addition of formaldehyde to such a solution of casein,—even if applied in a comparatively small proportion—has the effect of producing a perfect formaldehyde-casein-coagulum of a nature described later on.

Instead of the acid mentioned, any acid agent or salts or other media of precipitating casein from its alkaline or basic solution may be used, all of these substances being true equivalents in so far as the present invention is concerned, and the inventor wishes that it be understood, that the term "acid" as used in this specification, and its annexed claims, comprises any of these media of the character defined.

Instead of the ammonia mentioned any other ammonia preparation or ammonium compound may be used and the inventor wishes it likewise to be understood that the term "ammonia" as used in this specification and its annexed claims comprises any medium of the nature defined. Quite a different result is to be obtained if the first mentioned solution of original casein in ammonia is neutralized at first with an acid and then formaldehyde is added to it;—even by using small quantities of the latter—it is noticed that soon a complete coagulation in a stiff form, that is as a homogeneous cohering mass takes place, which becomes gradually more and more compact.

It is not necessary to use ammonia as a preliminary solution-medium for the casein in order to get—after having treated it with an acid or the like—a casein-coagulation by means of formaldehyde, there may be also used any other solution-medium for the casein, in such a case it is only necessary to let ammonia act at any time on the casein of this solution. By taking, for instance, the alkali-casein-solution first mentioned, acidulating it and then adding to it some ammonia, the formaldehyde will likewise produce from the solution thus obtained a cohering homogeneous coagulum.

One can also precipitate the casein out of any suitable basic-casein-solution by a salt or by an acid or by another substance of acid reaction and resolve the precipitated casein in some ammonia-water. The formaldehyde will then likewise produce the special coagulum. Furthermore, it is not absolutely necessary to neutralize the ammonia-casein-solution mentioned above by an acid or the like, to get a coagulation by means of formaldehyde, one may also treat the ammonia-casein-solution with so much acid only, as the solution still remains basic or also add so much acid that the solution reacts acid. If wished for, one may transform again such a neutral or acid solution, which has been formed out of the primordial ammonia-casein-solution, into a solution of a basic reaction and in all these cases, the characteristic coagulum is obtained by means of formaldehyde.

The casein-coagulum effected by formaldehyde is not at all similar to that obtained by acids or salts. Whereas the casein or other similar albuminous substances are precipitated, for instance, by bodies of acid reaction,—even by using very small quantities—in the shape of a curded precipitate of grained or stringy nature, it is possible to obtain by means of formaldehyde a separation in a cohering compact and homogeneous mass, which generally has the appearance of a gelatinized condition, but has not the nature of the same, as it has the tendency, when drying gradually, to contract under considerable power of cohesion, and to deliver up its liquid particles to a porous layer or other absorbent surface. One also obtains the cohering casein-coagulum, even when one dissolves the original casein in diluted acids or the like—whereby organic as well as inorganic acids may be used—or also in solutions of acid salts, and treats this acid-casein-solution either with only so much ammonia that the solution remains still acid, or with so much ammonia that the solution turns neutral or reacts basic and then operates with formaldehyde.—(Out of an acid-casein-solution, without addition of ammonia, the formaldehyde precipitates only sparingly the casein in a curded form of grained or stringy nature.)

If the present process is intended for producing a material for the manufacture of objects or articles, the formaldehyde-casein-coagulum will—as a stiff mass—be turned out of the vessel or mold into which the prepared and treated casein-solution formerly had been poured as a liquid and in which the coagulation has taken place and will then be dried or hardened under pressure or heat, or by both, pressure and heat. By a corresponding choice of quantities of the substances of acid reaction or the salts used for the treatment of the casein, one is able to influence the qualities of the final products. The adding of less or more formaldehyde as will be necessary for the coagulation also varies the properties of the products. Therefore it is possible to obtain after this method a very hard product as well as a softer one, but anyhow there will always be a perfectly homogeneous body produced, even by manufacturing products of large dimensions, for instance, bars or cylindrical blocks with considerable cross-sections, as the formaldehyde influences all casein-molecules during its chemical action on the casein while it is still liquid. Furthermore, the producing of a formaldehyde-casein-coagulum—as a stiff mass in a cohering shape—has an advantage over the curded casein precipitation in a grained or stringy shape and this shall be illustrated in the following: If, for instance, the older method hitherto known, is used, and the casein is precipitated by means of salt or an acid in a curded state and ground, after removing the fluid, there remains a moist precipitated mass, and this mass is placed on an absorbent surface and allowed to dry, there will very frequently be obtained a product with a great number of small air bubbles in it, which still remain after the final product has hardened. This fault is most disturbing, especially when using the clarified pure casein, and is always noticed in transparent products. It is not possible, always to produce casein blocks, after the old method, of great volume without bubbles; whereas by the new process described herein, there is no difficulty to produce products without bubbles and transparent products of perfect limpidity and clearness.

The process allows the casein-solution or mass, to be combined without difficulty with coloring bodies or substances, which would impart greater hardness or greater softness and elasticity, or the same may be mixed with filling materials of various character, or also with other plastic or hard masses. One may also act on the casein-substance, coagulated by means of formaldehyde, during the drying or hardening, as well as afterwards with gaseous or dissolved formaldehyde; furthermore, the coagulated mass may be treated with solutions of salt or with bodies of either acid or basic reaction.

In order to show the nature of this invention still more explicitly and to illustrate the way in which it is carried out the inventor mentions three working examples, but solely as examples and in no way restricting himself to these particular processes. It is obvious that the difference between the three examples does in no way affect the essence of the present invention and that the three examples are true equivalents for obtaining the new effect of enabling dissolved casein to be transformed into a true perfect coagulum by means of formaldehyde. The first example is intended to illustrate how a colored formaldehyde - casein - coagulum is produced from a casein solution of slight acid character; the second example shows how a transparent casein product is manufactured in combination with filling materials and produced from an alkali - casein - solution which is first properly treated with a salt and then with ammonia and which finally—as a casein-solution thus obtained with basic reaction—is treated with formaldehyde; the third example shows how a hornlike casein mass may be produced from an acid casein-solution, which is transformed by ammonia to a solution of almost neutral character and which is coagulated after this with formaldehyde.

First example: Dissolve casein in a watery solution of ammonia and gradually add stirring all the time, to this casein-solution, some diluted acid (for instance sulfuric acid) so that no permanent precipitation is allowed to be formed and until the solution shows a slight acid reaction. (If any small separation of casein occurs one can wait awhile until this separated casein will spontaneously be redissolved, or warm the liquid.)—When the solution has turned cold, mix it with a color body (for instance anilin red), add, while stirring, some dissolved formaldehyde and pour the solution into a form. After a short time of rest a formaldehyde-casein-coagulation is produced.

Second example: Decant the clear solution produced by 1 liter alkaline-casein-solution, containing about 100 grams of casein and about 15 grams of caustic alkali, precipitate the casein by means of a salt (for instance nickel sulfate). After settling the liquid is removed from the precipitation and the latter at once redissolved in water to which ammonia has been added in such a proportion that the solution obtained shows basic reaction. This solution is then mixed with a filling material (for instance bronze powder) and treated with formaldehyde; a cohering casein-coagulum will be produced. This product is when dried transparent and has a sea-green glittering appearance.

Third example: Dissolve casein in diluted acid (for instance hydrochloric acid) and add to it some ammonia, for instance so much that the solution shows almost neutral character. Mix this solution with some formaldehyde; there will be noticed sooner or later a perfect coagulum, as a cohering mass. As soon as the mass has become sufficiently consistent, pour it out of the vessel or frame—form and place it on a layer of filtering paper or other absorbent surface and allow it to dry a little by turning it over occasionally.

The mass has the tendency to contract under considerable power of cohesion and to deliver its liquid particles to the porous layer. Put in action on the plate thus obtained—when nearly dry but still moist—once more formaldehyde and harden it in heat or under pressure.

Having thus described my invention or discovery I claim and desire to secure by Letters Patent:

The herein described process of producing a compact homogeneous and water-resisting mass from casein (or other albuminous substances) which process consists in treating an acidulated solution of casein with ammonia, adding formaldehyde, allowing the coagulum to settle, separating it from the liquid, drying it and acting upon the drying substance with formaldehyde.

In testimony whereof I have hereunto set my hand in presence of two subscribing witnesses.

PAUL WILHELM FERDINAND GEORG BETZ.

Witnesses:
 PAUL E. SCHILJING,
 PAUL ARRAS.